Dec. 22, 1953  H. G. HAAS  2,663,840
TWO-STAGE STARTING SYSTEM
Filed June 29, 1951
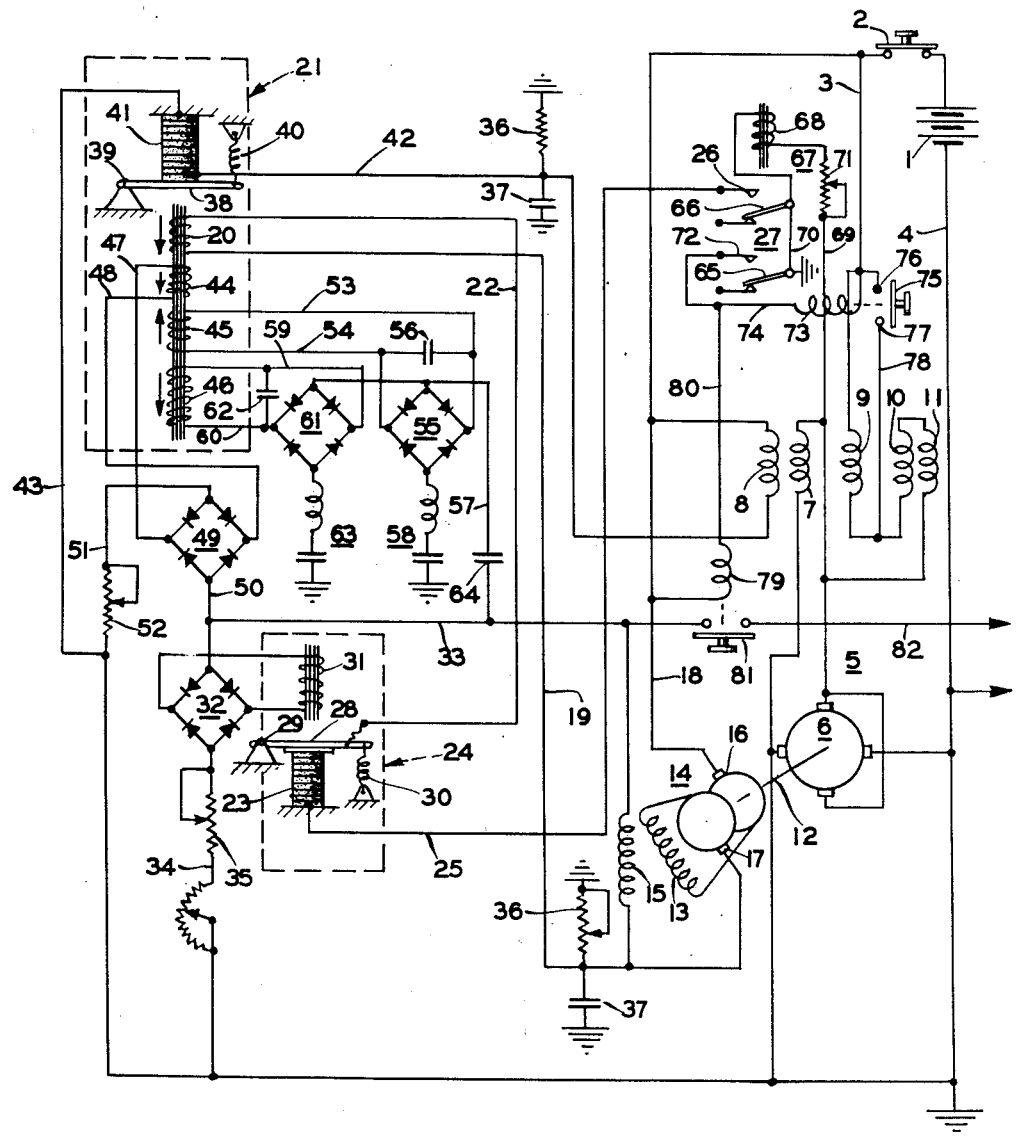
INVENTOR.
HAROLD G. HAAS
BY
ATTORNEY Patented Dec. 22, 1953

2,663,840

UNITED STATES PATENT OFFICE 2,663,840

TWO-STAGE STARTING SYSTEM

Harold G. Haas, Belleville, N. J., assignor to Bendix Aviation Corporation, Teterboro, N. J., a corporation of Delaware Application June 29, 1951, Serial No. 234,351

5 Claims. (Cl. 322—16)

The present invention relates to motor generators or inverters and more particularly to a starting system for motor generators or inverters.

In motor generators or inverters that have direct current motors operated directly from a direct current power supply, there is a tendency for excessive arcing of the motor brushes on the starting cycle. This is due to the inrush of the heavy starting current which is substantially greater than the running current. Excessive arcing shortens brush life and may cause serious damage to the commutator or other parts of the motor.

In the present invention, excessive arcing is prevented by providing a running series field of a wire size large enough to carry continuous line current, and a starting series field of a smaller size conductor that will provide additional series ampere turns and also adds resistance to the starting circuit. This decreases the inrush motor current. A pilot relay is connected across the motor armature and short circuits the starting series field after the first inrush peak current is past.

An object of the invention is to provide an improved starting system for a motor generator.

Another object of the invention is to provide means for preventing excessive arcing in starting an inverter.

Another object of the invention is to provide novel control means for effecting the starting of a motor generator.

Another object of the invention is to provide a two-stage starting system for an inverter.

The above and other objects and features of the invention will appear more fully hereinafter from a consideration of the following description taken in connection with the accompanying drawing wherein one embodiment of the invention is illustrated by way of example.

In the drawing:

The single figure is a diagrammatic showing of a system embodying the invention.

Referring to the drawing, there is provided a source of direct current which, for the purpose of illustration, is shown as a battery 1 which is connected through switch 2, conductors 3 and 4 to a D. C. motor indicated generally by the numeral 5. The switch 2 is illustrated as being manually controlled, it is understood, however, that it may be controlled in any conventional manner. The motor 5 has an armature 6, shunt field winding 7, regulating field winding 8, starting series winding 9, main series winding 10 and interpole winding 11.

One end of the starting series field winding 9 is connected to the conductor 3, the other end is connected to one end of the main series winding 10. The other end of the winding 10 is connected to one end of the interpole winding 11. The other end of the winding 11 is connected to the armature 6.

The motor 5 drives, through a shaft 12 diagrammatically represented by the dashed line 12, an exciting winding 13 of an alternator indicated generally by the numeral 14 and having a stator winding 15. While a single phase alternator has been illustrated by way of example, it is understood that the alternator may be multiphase as well.

The exciting winding 13 is connected to slip rings 16 and 17. The ring 16 is connected by a conductor 18 to the load side of the switch 2, while the ring 17 is connected by conductor 19 to one side of a winding 20 of a frequency regulator 21, the function of which will be explained later. The other end of the winding 20 is connected by a conductor 22 to one end of a variable resistance or carbon pile element 23 of a voltage regulator indicated generally by the numeral 24. The opposite end of the carbon pile element 23 is connected by a conductor 25 to a contact member 26 of a switch 27 the operation of which will be explained later.

The voltage regulator 24 is shown diagrammatically as including an armature 28 pivoted at 29 and biased under tension of a spring 30 in a direction tending to decrease the resistance of the pile 23 and thereby increasing the energization of exciting winding 13 so as to affect an increase in the voltage output of the alternator 14.

An electromagnetic winding 31 biases the armature 28 in a direction opposing the spring 30 and tending to increase the resistance of the carbon pile 24 so as to decrease the energization of the exciting winding 13 and thereby decrease the output voltage of the alternator 14. The winding 31 is connected across the output of a rectifier 32. The input of the rectifier 32 is connected across the stator winding 15 of the alternator 14 by conductor 33 and grounded connection 34. The grounded connection 34 may include a resistor 35. A resistor 36 and a capacitor 37 may be connected in parallel across the carbon pile element 23 to reduce the inductive field discharge in the element 23 thereby preventing arcing and burning of the element 23.

The frequency regulator 21 is shown diagrammatically as including an armature 38, pivoted at 39 and biased under the tension of a spring 40 in a direction tending to decrease the resistance of a carbon pile element 41. The carbon pile element 41 is connected by conductors 42 and 43 in series with the regulating winding 8. A decrease in the resistance of the carbon pile 41 increases the energization of the regulating winding 8 so as to effect a decrease in the speed of the motor 5.

Electromagnetic windings 44, 45, 46 and the winding 20 coact to bias the armature 38 in a direction opposing the spring 40 and tending to increase the resistance of the carbon pile 41 so as to decrease the energization of the regulating winding 8 and thereby increase the speed of the motor 5.

The main control winding 44 is connected by conductors 47 and 48 across the output of a rectifier 49 connected by a conductor 50 and grounded connection 51 across the output of the stator winding 15 of the alternator 14. The grounded connection 51 may include a variable resistor 52. The winding 44 is thus responsive to the output voltage of the alternator 14 and tends to increase the speed of the motor 5 in response to such voltage.

The winding 45 is connected by conductors 53 and 54 across the output of a rectifier 55. A capacitor 56 may be connected across the output terminals of the rectifier 55. The rectifier 55 is connected across the output of the stator winding 15 by a conductor 57 and a series resonant circuit 58.

The winding 46 is connected by conductors 59 and 60 across the output of a rectifier 61. A capacitor 62 may be connected across the output of the rectifier 61. The rectifier 61 is connected across the output of the stator winding 15 by the conductor 57 and a series resonant circuit 63. A voltage dropping capacitor 64 may be inserted in the conductor 57 to limit the voltage applied to the rectifiers 55 and 61.

The windings 45 and 46 are in opposing relationship. One of the resonant circuits is adjusted to resonate at slightly below the operating frequency and the other resonant circuit is adjusted to resonate at slightly above the operating frequency. A shift in frequency from the operating frequency will provide a push-pull effect from the windings 45 and 46 in a direction depending upon the direction of the shift to return to the operating frequency.

A novel feature of the invention is the arrangement of the switch 27. The switch 27 includes contact arms 65 and 66 biased, in a normally open position by gravity or a spring, or in any other suitable manner and are adapted to be actuated to a closed position by electromagnet 67. The electromagnet 67 has a control winding 68 connected across the armature 6 of the motor 5 by conductor 69 and grounded connection 70. A resistor 71 may be inserted in the conductor 69 to adjust the voltage in the winding 68. The contact arm 66 cooperates with the contact 26 to connect the conductor 25 to the grounded connection 70 when the arm 66 is in the closed position. The contact arm 65 coacts with switch contact 72 and connects the contact 72 to the grounded connection 70 when the arm 65 is in the closed position.

One end of a control winding 73 is connected by a conductor 74 to the contact 72. The other end of the winding 73 is connected to the conductor 3. When energized the winding 73 is adapted to actuate a switch member 75 to a closed position. The switch member 75 is biased normally in an open position by any suitable means. The switch member 75 cooperates with contacts 76 and 77. The contact 76 is connected to the conductor 3 and the contact 77 is connected by a conductor 78 to the end of winding 9 remote from the end connected to the conductor 3 so that when the switch member 75 is in the closed position, the winding 9 is shunted by the conductor 78.

A control winding 79 is connected by a conductor 80 to the contact 72. The other end of the winding 79 is connected to the conductor 18. The winding 79 when energized is adapted to actuate a switch member 81 in output line 82 to a closed position. The switch member 81 is biased in a normally open position by gravity or other suitable means.

In operation, upon the closing of the switch 2 the starting series field winding 9 is in series with the main field winding 10. The winding 9 is of a smaller size wire and provides additional series ampere turns. In addition, it adds increased resistance to the starting circuit thereby decreasing the inrush motor current.

The control winding 68 is connected across the motor armature 6 and is responsive to the back E. M. F. In starting the back E. M. F. is very low and increases as the motor accelerates. The winding 68 is proportional so that as the back E. M. F. across the armature approaches that of its normal operating value, it actuates the switch 27 to a closed position. Closure of the switch 27 energizes the windings 73 and 79 causing actuation of the respective switch members 75 and 81 to a closed position.

Closure of the switch 75 completes a circuit shorting out the starting series winding 9. Closure of the switch 81 connects the output of the alternator 14 to the output line 82.

Also, closure of switch 27 connects the voltage regulator 24 into the system thus permitting the alternator to build up and reach operating terminal voltage.

Although only one embodiment of the invention has been illustrated and described, various changes in the form and relative arrangement of the parts, which will now appear to those skilled in the art, may be made without departing from the scope of the invention.

What is claimed is:

1. In a motor generator system, the combination comprising an alternating current generator, an electric motor for driving said generator, said motor having a main series field winding, an auxiliary series winding, a shunt winding and an armature winding, frequency and voltage regulating means responsive to the output of said generator, relay means responsive to the back electromotive force across said armature winding to short out said auxiliary winding and connect said voltage regulating means into said system.

2. In a motor generator system comprising an alternating current generator having an output circuit; a direct current motor for driving said generator, said motor having an armature winding, a shunt field winding, a main series field winding and a starting field winding, said starting field winding being of smaller size wire and having greater resistance than said main series winding, means for energizing said motor, first relay means for shunting said starting winding, second relay means for connecting said generator to said output circuit and a pilot relay responsive to the back electromotive force across said armature winding to energize said first and second relay means whereby said starting winding is shunted and said generator is connected to said output circuit.

3. In a two stage starting system for an inverter having an alternating generator and a direct current motor for driving the generator, said motor having a main series winding, a shunt winding, and an armature winding, voltage and frequency regulating means; the improvement comprising an auxiliary series winding, means responsive to the back electromotive force across said armature winding for shunting said auxiliary winding and energizing said regulating means upon said electromotive force exceeding a predetermined value.

4. In a motor generator system comprising an alternating current generator having an output circuit; a direct current motor for driving said generator, said motor having a main series field, an auxiliary series field, shunt field and armature winding; regulating means, a direct current source for energizing said motor, a first switch means for shorting out said auxiliary series field, a second switch means for connecting said regulating means in said system, a third switch means for connecting said generator to said output circuit, and relay means responsive to the back electromotive force across said armature winding to actuate said switch means upon said electromotive force exceeding a predetermined value.

5. A control system for a motor generator comprising an alternating current generator, a direct current motor for driving said generator, said motor having a main series field winding, a starting series field winding, a shunt field winding, and an armature winding, voltage and frequency regulating means responsive to the output of said generator, a direct current source, first switch means for connecting the input of said motor to said source, second switch means responsive to the back electromotive force across said armature winding to shunt said starting series field winding upon said back electromotive force exceeding a predetermined value, and means responsive to the operation of said second switch means to connect said voltage regulating means in said system and connect said generator to an output circuit.

HAROLD G. HAAS.

References Cited in the file of this patent

UNITED STATES PATENTS

| Number | Name | Date |
|---|---|---|
| Re. 14,104 | Jackson | Apr. 11, 1916 |
| 2,492,527 | Haas | Dec. 27, 1949 |